(12) United States Patent
Blondin et al.

(10) Patent No.: US 6,306,530 B1
(45) Date of Patent: Oct. 23, 2001

(54) SYSTEM FOR PREVENTING GAS POCKET FORMATION IN A PEM COOLANT FLOW FIELD

(75) Inventors: Melanie A Blondin, Windsor; Robin J. Guthrie, East Hartford, both of CT (US); Richard D. Sawyer, Groveton, NH (US); Deliang Yang, Vernon; Robert R. Fredley, Tolland, both of CT (US)

(73) Assignee: International Fuel Cells LLC, South Windsor, CT (US)

( * ) Notice: Subject to any disclaimer, the term of this patent is extended or adjusted under 35 U.S.C. 154(b) by 0 days.

(21) Appl. No.: 09/141,086

(22) Filed: Aug. 27, 1998

(51) Int. Cl.$^7$ ............................... H01M 8/04; H01M 8/10
(52) U.S. Cl. ................................. 429/13; 429/26; 429/30; 429/34
(58) Field of Search ................................. 429/26, 30, 33, 429/34

(56) References Cited

U.S. PATENT DOCUMENTS

| | | |
|---|---|---|
| 3,867,206 | 2/1975 | Trocciola et al. . |
| 4,279,970 | 7/1981 | Breault et al. ........................ 429/35 |
| 4,729,932 | 3/1988 | McElroy ............................... 429/34 |
| 4,769,297 | 9/1988 | Reiser et al. .......................... 429/17 |
| 5,176,996 | 1/1993 | Hogan et al. ........................... 435/6 |
| 5,230,966 | * 7/1993 | Voss et al. ............................. 429/26 |
| 5,264,299 | 11/1993 | Krasij et al. ........................... 429/30 |
| 5,300,124 | 4/1994 | Breault et al. ...................... 29/623.3 |
| 5,360,679 | 11/1994 | Buswell et al. ........................ 429/19 |
| 5,366,825 | 11/1994 | Breault et al. ......................... 429/34 |
| 5,464,700 | 11/1995 | Steck et al. ............................ 429/30 |
| 5,503,944 | 4/1996 | Meyer et al. .......................... 429/13 |
| 5,514,487 | * 5/1996 | Washington et al. .............. 429/34 X |
| 5,523,175 | 6/1996 | Beal et al. ............................. 429/30 |
| 5,547,776 | * 8/1996 | Fletcher et al. .................... 429/26 X |
| 5,700,595 | 12/1997 | Reiser ................................... 429/13 |
| 5,922,485 | * 7/1999 | Enami .................................. 429/26 |

FOREIGN PATENT DOCUMENTS

389020 B   10/1989   (AT) ............................... H01M/8/02

* cited by examiner

Primary Examiner—Stephen Kalafut
(74) Attorney, Agent, or Firm—Barlow, Josephs & Holmes, Ltd.

(57) ABSTRACT

A PEM flow field system of coolant medium for preventing the formation and accumulation of gas bubbles, having a critical viscous pressure drop therein is provided. The water transport plate includes a coolant flow field channel therein having an input port and an exit port. The coolant flow field channel includes at least one upward flow channel portion, at least one downward flow channel portion. Coolant medium is fluidly routed through the coolant flow field channel of the water transport plate at a flow rate which results in a viscous pressure drop that is greater than the buoyancy of a gas bubble trapped within the coolant flow field channel to prevent the accumulation thereof within the coolant flow field channel.

10 Claims, 2 Drawing Sheets

SYSTEM FOR PREVENTING GAS POCKET FORMATION IN A PEM COOLANT FLOW FIELD

TECHNICAL FIELD

The present invention relates to fuel cells and water transport plates for fuel cells. More specifically, the present invention relates to water management within fuel cells including the reduction of gas pocket formation in the coolant flow field within the fuel cell.

BACKGROUND ART

Solid polymer electrolyte fuel cell power plants are known in the prior art, and prototypes are even available from commercial sources, such as Ballard Power Systems, Inc. of Vancouver, Canada. These systems are serviceable, but are relatively complex. An example of a Ballard Power Systems polymer membrane power plant is shown in U.S. Pat. No. 5,360,679, granted Nov. 1, 1994.

In addition, known fuel cell constructions commonly include a proton exchange membrane disposed between respective cathode and anode plates. In general, the operation of a proton exchange membrane (PEM) fuel cell includes the supply of gaseous fuel and an oxidizing gas to the anode electrode plate and cathode electrode plate, respectively, and distributed as uniformly as possible over the active surfaces of the respective electrode plates, or, more specifically, the electrode plate surfaces facing the proton exchange membrane, each of which typically includes a catalyst layer therebetween. An electrochemical reaction takes place at and between the anode plate and cathode plate, with attendant formation of a product of the reaction between the fuel and oxygen, release of thermal energy, creation of an electrical potential difference between the electrode plates, and travel of electric charge carriers between the electrode plates, with the thus generated electric power usually constituting the useful output of the fuel cell.

One problem occurring in solid polymer fuel cells relates to the management of water, both coolant and product water, within the cells in the power plant. In a solid polymer membrane fuel cell power plant, product water is formed by an electrochemical reaction on the cathode side of the cells, specifically by the combination of hydrogen ions, electrons and oxygen molecules. The product water must be drawn away from the cathode side of the cells, and makeup water must be provided to the anode side of the cells in amounts which will prevent dryout of the proton exchange membrane, while avoiding flooding of the cathode.

Austrian Patent No. 389,020 describes a hydrogen ion-exchange membrane fuel cell stack which utilizes a fine pore water coolant plate assemblage to provide a passive coolant and water management control. The Austrian system utilizes a water-saturated fine pore plate assemblage between the cathode side of one cell and the anode side of the adjacent cell to both cool the cells and to prevent reactant crossover between adjacent cells. The fine pore plate assemblage is also used to move product water away from the cathode side of the ion-exchange membrane and into the coolant water stream; and to move coolant water toward the anode side of the ion-exchange membrane to prevent anode dryout. The preferred directional movement of the product and coolant water is accomplished by forming the water coolant plate assemblage in two parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network, and are disposed in face-to-face alignment between adjacent cells. The finer pore plate is thinner than the fine pore plate so as to position the water coolant passages in closer proximity with the anodes than with the cathodes. The aforesaid solution to water management and cell cooling in ion-exchange membrane fuel cell power plants is difficult to achieve due to the quality control requirements of the fine and finer pore plates, and is also expensive because the plate components are not uniformly produced.

In the fuel cell technology, the water transport plate is a porous structure filled with water. During fuel cell operation, the water transport plate supplies water locally to maintain humidification of a proton exchange membrane (PEM), removes product water formed at the cathode, removes by-product heat via a circulating coolant water stream, conducts electricity from cell to cell, provides a gas separator between adjacent cells and provides passages for conducting the reactants through the cell. The water transport plate supplies water to the fuel cell to replenish water which has been lost by evaporation therefrom. This system and operation thereof is described in U.S. Pat. No. 5,303,944 by Meyer, U.S. Pat. No. 5,700,595 by Reiser and U.S. Pat. No. 4,769,297 by Reiser, each incorporated herein by reference.

In addition, the environmental and operational parameters of a water transport plate must be carefully balanced to obtain optimum performance of the overall fuel cell. For example, parameters of the water transport plate such as pore size, resistivity, particle size, resin content, yield strength and coolant flow rate therein must be properly selected to obtain bubble pressure characteristics and water permeability which are acceptable for efficient operation of the fuel cell.

A major concern with PEM fuel cells is the water management with the cell. This is of particular concern when employing porous members such as the water transport plates discussed above. This porosity is needed to supply to and substantially uniformly distribute over the respective active surface the respective gaseous medium which is fed through respective channels provided in the anode water transport plate and the cathode water transport plate to the areas of the respective electrode plate that are spaced from the proton exchange membrane. Also, these porous structures are used to remove the reaction water from one of the active surfaces and to supply water to the other active surfaces to avoid drying out of the proton exchange membrane.

There is a particular concern in PEM fuel cells relating to reactant cross-over into the coolant channels. As can be understood such cross-over greatly diminishes the efficiency of the cell and can lead to a hazardous condition. In a water transport plate, a reactant gas barrier and water permeable member can only be formed and maintained when the pores in the water transport plate are filled with water. If the water transport plate of the PEM cell ceases to be filled with water, local dryout of the cell can easily occur resulting in the aforementioned problems. When he fine pores of the water transport plate dry out, reactant gases an easily break through, even at low pressures.

There are several causes that result in gas bubbles within the coolant. Bubbles can form due to residual gases within the coolant channels during start-up, outgassing of dissolved gases in the coolant due to changes in the coolant temperature, and due to mechanical leakage since the coolant system operates below ambient pressure. These bubbles may locally accumulate in the coolant flow channels resulting in a section of the cooler that is not supplied with the coolant. As the size of the bubble increases, in-plane permeability of water within the water transport plates is inadequate to maintain saturation of the water transport plate, and local dryout of the water transport plate occurs. This results in reactant leakage into the coolant system, and local over-heating of the cell, both of which creates a dangerous condition. In known PEM cells, the difficulty in effectively flushing out the gas bubbles exacerbates the problem of local dryout.

Typically, PEM fuel cells have water transport plates with vertically positioned coolant channels with upward and downward flowing legs. Gas bubbles can get trapped in the downward flowing leg of the coolant channel configuration. Once enough adjacent channels are filled with gas, the performance of the water transport plate is greatly hindered. With a portion of the water transport plate deprived of coolant water, the water transport plate must rely solely on its in-plane permeability to supply the reactant gases with water for saturation. However, at high power levels which are equivalent to increased cell temperatures, the in-plane permeability of the water transport plate is not enough to keep up with the water demand within the cell. As a result, the water transport plate begins to dry out.

Dryout of the water transport plate diminishes its ability to effectively act as a gas barrier. At a low enough water fill level, the plate allows for reactant gas to cross over into the coolant stream. At this point, the water transport plate does not have the ability to recover unless the trapped gas bubbles are physically swept out of the coolant flow field to permit water to flow over the dry areas to rewet the water transport plate.

In view of the foregoing, an improved fuel cell is desired which includes the ability to prevent local dryout of the water transport plate of the PEM fuel cell for efficient fuel cell operation. It is also desirable for a PEM fuel cell to include the ability to flush trapped reactant gas bubbles from the coolant flow field.

DISCLOSURE OF THE INVENTION

The present invention preserves the advantages of prior art proton exchange membrane for fuel cells. In addition, it provides new advantages not found in currently available fuel cells, and overcomes many disadvantages of such currently available fuel cells.

The invention is generally directed to a novel fuel cell with gas pocket prevention characteristics. A PEM flow field system of coolant medium for preventing the formation and accumulation of gas bubbles, having a critical viscous pressure drop therein is provided. A water transport plate including a coolant flow field channel therein having an input port and an exit port. The coolant flow field channel includes a first upward flow channel portion, a downward flow channel portion connected to the first upward flow channel portion and a second upward flow channel portion connected to the downward flow channel portion at an end of the downward flow channel portion not connected to said first downward flow channel portion. The end of the first upward flow channel portion not connected to the downward flow channel portion serves as an input port and an end of the second upward flow channel portion not connected to said downward flow channel portion serves as an output port. Coolant medium is fluidly routed through the coolant channels in the water transport plate at a flow rate which results in a viscous pressure drop that exceeds the buoyancy of a gas bubble trapped within the coolant flow field channel to prevent the accumulation of such gas bubble within the coolant flow field channel.

It is therefore an object of the present invention to provide a PEM fuel cell assembly which prevents gas pocket formation within a coolant flow field.

It is yet another object of the present invention to provide a PEM fuel cell assembly which flushes gas bubbles out the coolant flow field.

It is also an object of the present invention to provide a PEM fuel cell assembly which prevents local dryout of the water transport plate.

It is an object of the present invention to provide a PEM fuel cell assembly which prevents the mixture of gaseous fuel and oxidizing gas.

It is further an object of the present invention to provide a PEM fuel cell assembly which prevents the cross-over of reactant gas into the coolant stream.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

MODES FOR CARRYING OUT THE INVENTION

The present invention is directed toward a fuel cell, with at least one water transport plate and a proton exchange membrane, which includes reactant gas pocket prevention characteristics. More specifically, the present invention provides a system for preventing the formation and accumulation of gas pockets that may be intrained in a liquid multi-pass PEM coolant flow field system.

In a PEM fuel cell, the bubble pressure is the physical characteristic that allows the water transport plate to serve as a gas separator. Bubble pressure is increased as the pore size of the water transport plate is decreased. Water permeability is required to remove liquid water from a water transport plate as explained in U.S. Pat. No. 5,503,944.

Typically, PEM fuel cells include water transport plates which have vertically positioned coolant channels with upward and downward flowing legs. In accordance with the present invention, a PEM flow field system of coolant medium is provided for preventing the formation and accumulation of gas bubbles.

Figure 1:
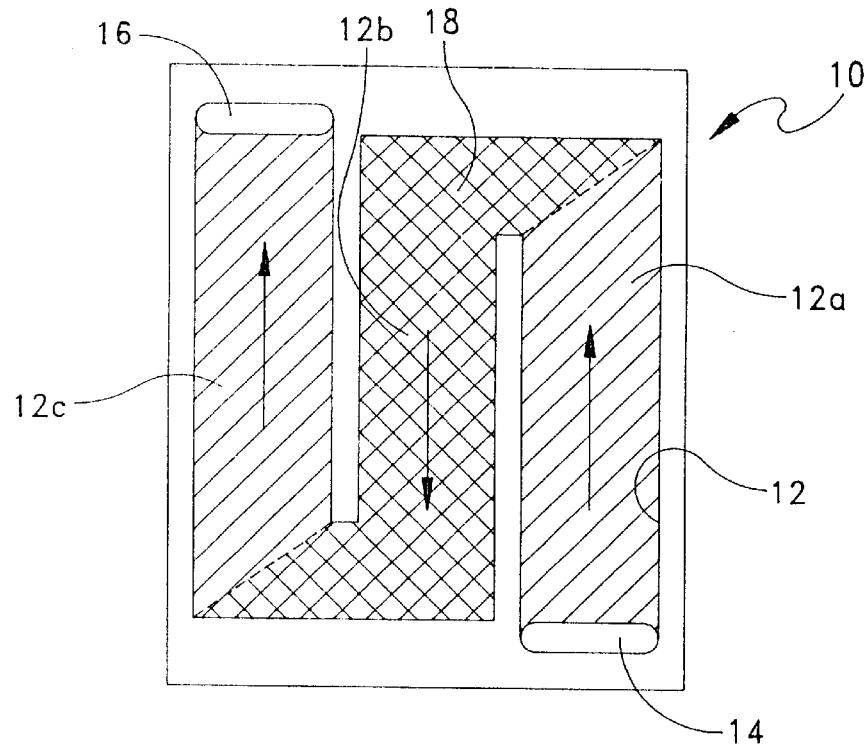
FIG. 1 is a side, partial cross-sectional view of a water transport plate with a liquid multi-pass PEM coolant flow field system of the present invention.

The present invention provides a system for preventing the accumulation of such gas bubbles to, thereby, avoid local dryout of the water transport plate. Referring first to FIG. 1, a water transport plate 10 is provided where water is the preferred coolant medium. In a PEM fuel cell, it is common for a number of water transport plates 10 to be employed in a stacked configuration (not shown), depending on the desired application. For ease of illustration and clarity, the following description of the present invention will be in connection with a single water transport plate 10. It should be understood that each water transport plate 10 within a given fuel cell preferably employs the system of the present invention.

Still referring to FIG. 1, the water transport plate 10 is employed in the system of the present invention. The water transport plate 10 includes a coolant flow field channel therein, generally referenced as 12, having an input port 14 and an exit port 16. FIG. 1 shows the coolant ports to be internal to the planform of the cell; but it should be understood by one skilled in the art that external coolant manifolds could also be utilized.

The coolant flow field channel 12 typically has vertically oriented channel portions 12a–c where the coolant, which is preferably water, enters the input port 14 and exits the exit port 16 travelling in an upward direction.

More specifically, the coolant flow field channel in a PEM fuel cell 12 includes a first upward flow channel portion 12a, a downward flow channel portion 12b connected to the first upward flow channel portion 12a and a second upward flow channel portion 12c connected to the downward flow channel portion 12b at an end of the downward flow channel portion 12b not connected to said first downward flow channel portion 12a. Alternatively, the coolant flow configuration may consist of two or more passes. Coolant medium, such as water, is fluidly routed through the water transport plate 10 at a flow rate which results in a viscous pressure drop that exceeds the buoyancy of a gas bubble trapped within the coolant flow field channel 12 to prevent the accumulation of such gas bubble within the coolant flow field channel 12.

Figure 2:
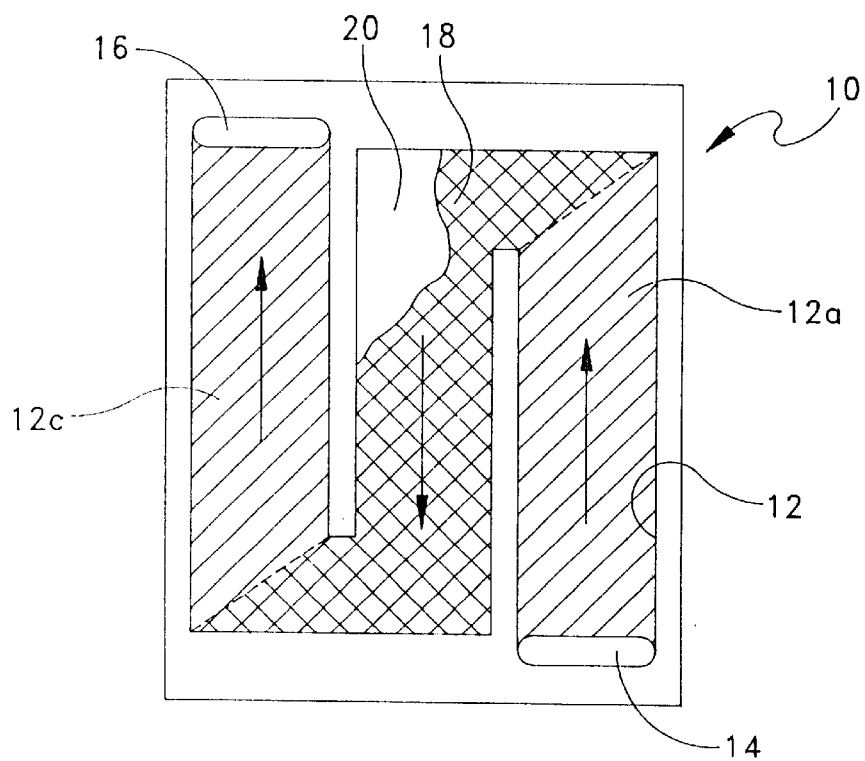
FIG. 2 is a side, partial cross-sectional view of the water transport plate of FIG. 1 illustrating a trapped gas bubble to be removed in accordance with the present invention.

Referring now to FIG. 2, region 18 of the coolant flow field channel 12 is an area which is highly susceptible to the formation of a gas bubble 20. After coolant flows upwardly through channel portion 12a, it must make a 180 degree turn to then flow downwardly through channel portion 12b. If there is a gas bubble 20 is present in the coolant flowing through the coolant flow field channel 12, there is a possibility that it would become trapped at region 18. Since a gas bubble tends to rise and float to the surface of a liquid, such as water, if there is a gas bubble in the coolant flow, it will float toward the top of water transport plate 10 within coolant flow field channel 12. If a gas bubble 20 is present in the coolant in channel portion 12c, it will simply rise and exit out of exit port 16. On the other hand, if a gas bubble 20 is present within channel portion 12a, it will rise and accumulate at the upper portion of region 18. The right to left transition flow from channel portion 12a to 12b further urges a gas bubble 20 to remain within channel portion 12b. Due to the upward flow of coolant in channel portion 12a, exit of a gas bubble 20 through input port 14 is not possible.

In accordance with the present invention, a system is provided where rate of flow of coolant through coolant flow field channel 12 results in a viscous pressure drop that exceeds the calculated buoyancy of a trapped gas bubble 20, such as the one illustrated in FIG. 2. To avoid the aforementioned "gas trap" tendency, a coolant flow rate is selected where the viscous pressure drop exceeds the buoyancy of the gas bubble 20. As a result, a trapped gas bubble 20 will be effectively flushed out of the coolant flow field channel 12 and exit out of exit port 16. In accordance with the present invention, the coolant flow is maintained at a minimum rate so that the viscous pressure drop in channel portion 12b exceeds the buoyancy of gas bubble 20 to displace the gas bubble 20. In accordance with the preferred embodiment of the present invention, a minimum coolant flow rate is maintained such that the viscous pressure drop is greater than the static head rise down a flow channel for a PEM fuel cell. For example, a cell that is twelve inches tall, requires a coolant flow rate such that the viscous pressure drop in the downward leg of the coolant channels is greater than twelve inches of water. At this minimum coolant flow rate, all gas bubbles 20 will be removed from the water transport plate 10 and, in turn, the entire fuel cell. This avoids dryout and inefficient fuel cell operation. At a high enough flow rate, all gas bubbles 20 will be removed from the coolant channels in the fuel cell and can be completely taken out of the coolant by employment of a gas separator (not shown). It should be understood that various minimum coolant flow rates may be employed depending on the fuel cell type, configuration and application.

EXAMPLE

An example illustrating the first embodiment is shown below. The water transport plate was tested in a rig that contained a heater plate that simulated the heat produced in a PEM fuel cell operating at 500 amps per square foot at a voltage of about 0.65 volts. The rig was constructed in a manner that allowed visual observations of bubbles in the coolant channels. Water was circulated through the rig at a rate of 5 to 50 pounds per hour (pph) at a temperature of 20 to 65 degrees centigrade.

The water transport plate had a height of 12.9 inches, a width of 6.3 inches and a thickness of 0.09 inches. The coolant flow configuration consists of three passes with each pass consisting of 24 channels each channel being 0.027 inches deep and 0.046 inches wide. The water transport plate was porous graphite with a porosity of 35–40 percent and a mean pore size of 2–3 microns.

The heated coolant was passed through the rig and the formation of discrete bubbles in individual channels was observed as well as the accumulation of these individual bubbles to form a large bubble at the top of the second pass of the cooler. Large bubbles were observed to be formed at the top of the second pass of the cooler at flow rates of 10–12 pph. Flows greater than 15 pph generally resulted in small unstable bubble formation at the top of the second pass of the cooler. No bubbles were observed to accumulate at the top of the second pass of the cooler at flows of 40 pph.

The pressure drop across the cooler was measured from 5 to 50 pph and found to be linear. The pressure drop per pass was found to be 14 inches of water at a flow of 40 pph.

Figure 3:
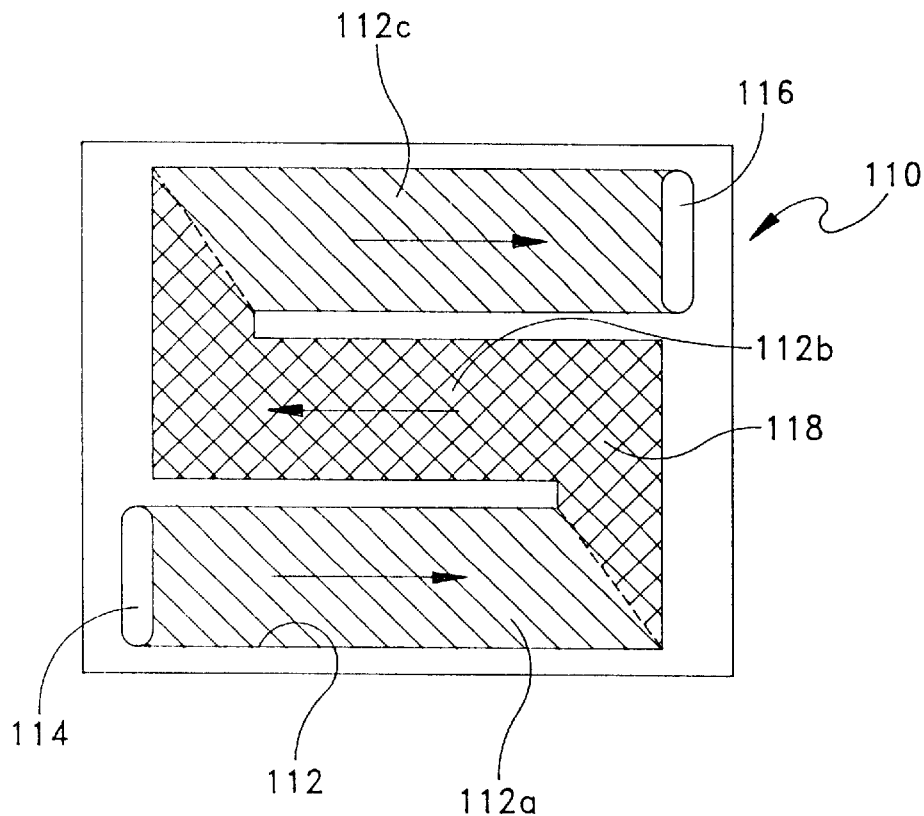
FIG. 3 is a side, partial cross-sectional view of a second embodiment of the flow field system of the present invention with water transport plate coolant channels oriented horizontally.

Turning now to FIG. 3, a second embodiment of the present invention is shown. The prevention of local dryout and reactant cross-over, while maintaining integrity of the cell, is to orient the water transport plate 110 so that the coolant flow channels 112a–c and transition region 118 are positioned horizontally, thereby eliminating any downlegs and potential "gas traps." The water transport plate 110 of the second embodiment of the present invention, includes a coolant flow field channel 112 having an input port 114 and an exit port 116. The coolant flow field channel including a first horizontal flow channel portion 112a having a first end and a second end. The first end of the first horizontal flow channel portion 112a serves as an input port 114. A second horizontal flow channel portion 112b, having a first end and a second end, is connected via its first end to the second end of the first horizontal flow channel portion 112a and is substantially parallel thereto. A third horizontal flow channel portion 112c, having a first end and a second end, is connected via its first end to the second end of the second horizontal flow channel portion 112b and is substantially parallel thereto. The second end of the third horizontal flow channel portion 112c serves as an exit port 116. Alternatively the coolant flow configuration may consist of two or more passes.

Figure 4:
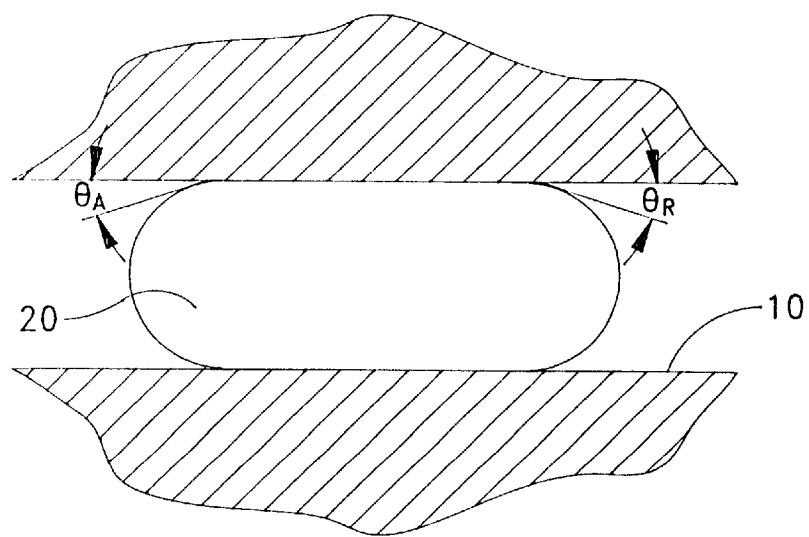
FIG. 4 is a side elevational view of a gas bubble illustrating the definition of net capillary force.

In this second embodiment, no gas bubbles are trapped in the channels 112a–c even at coolant flow rates less than the minimum rates for the vertical configuration of the first embodiment of present invention, discussed above in connection with FIGS. 1 and 2. In the absence of gas bubbles, local dryout of the water transport plate 110 and reactant gas cross-over is virtually eliminated. The employment of the horizontal coolant channels of the second embodiment illustrated in FIG. 3 greatly reduces the minimum coolant velocity that is required to ensure that all gas bubbles are removed from the coolant channels 12a–c. However, the coolant velocity must be high enough such that the pressure due to viscous drag exceeds the net capillary force on the gas bubble to be flushed from the fuel cell. As shown in the equation below and in FIG. 4, the net capillary force (NCF) is defined as the product of the geometry coefficient (k) multiplied by the surface tension of the liquid (δ) multiplied by the hydraulic diameter of channel (D=4×channel area/channel perimeter) multiplied by the difference between the cosine of the advancing angle ($\theta_A$) and receding contact angle ($\theta_R$).

$$NCF = kD\delta\{\cos\theta_A - \cos\theta_R\}$$

In accordance with this second embodiment, the minimum coolant flow rate of less than one quarter of that needed for a vertical oriented PEM fuel cell is required to ensure that the pressure due to viscous drag will exceed the net capillary force on the gas bubble for effective flushing from the fuel cell.

The horizontal configuration of the second embodiment also allows for less stringent water transport plate parameters. For example, the minimum required flow velocity is less than the flow velocity required in the first embodiment of the present invention. In addition, the current in-plane permeability of a water transport plate 110 does not have to increase because both the in-plane and through-plane water transfer is sufficient to keep up with the water demand when there are no gas bubbles in the coolant. As a result, the density of the water transport plate 110 may be lowered and still satisfy the criteria and serve as an effective gas barrier while simultaneously providing the added benefit of increased water permeability. It should be understood that various minimum coolant flow rates for this horizontal configuration may be employed depending on the fuel cell type, configuration and application.

It would be appreciated by those skilled in the art that various changes and modifications can be made to the illustrated embodiments without departing from the spirit of the present invention. All such modifications and changes are intended to be covered by the appended claims.

What is claimed is:

1. A method of preventing the formation and accumulation of a gas bubble, having a critical viscous pressure drop, in a PEM flow field system of coolant medium, comprising the steps of:
    providing a water transport plate including a coolant flow field channel therein having an input port and an exit port;
    providing at least one upward flow channel portion, arranged substantially perpendicular to ground, in said coolant flow field channel;
    providing at least one downward flow channel portion, arranged substantially perpendicular to ground;
    connecting said at least one upward flow channel portion to said at least one downward flow channel portion to each other in alternating fashion; and
    fluidly routing coolant medium through said coolant flow field channel of said water transport plate at a flow rate that results in a viscous pressure drop that is greater than the buoyancy of a gas bubble trapped within said coolant flow field channel.

2. The method of claim 1, wherein said viscous pressure drop is at least equal to a net capillary force of a bubble down a flow channel.

3. The method of claim 1, wherein said flow rate results in a pressure drop that is approximately equal to a net capillary force of a bubble down a flow channel.

4. The method of claim 1, wherein said coolant flow field channel is substantially free of gas bubbles.

5. The method of claim 1, wherein said coolant medium is water.

6. A method of preventing the formation and accumulation of a gas bubble, having a critical viscous pressure drop, in a PEM flow field system of coolant medium, comprising the steps of:
    providing a water transport plate including a coolant flow field channel therein having an input port and an exit port;
    providing at least one leftward flow channel portion, arranged substantially parallel to ground, in said coolant flow field channel;
    providing at least one rightward flow channel portion, arranged substantially parallel to ground;
    connecting said at least one leftward flow channel portion to said at least one rightward flow channel portion to each other in alternating fashion; and
    fluidly routing coolant medium through said coolant flow field channel of said water transport plate at a flow rate that results in a viscous pressure drop that is greater than the buoyancy of a gas bubble trapped within said coolant flow field channel.

7. The method of claim 6, wherein said viscous pressure drop is at least equal to a net capillary force of a bubble down a flow channel.

8. The method of claim 6, wherein said flow rate results in a pressure drop that is approximately equal to a net capillary force of a bubble down a flow channel.

9. The method of claim 6, wherein said coolant flow field channel is substantially free of gas bubbles.

10. The method of claim 6, wherein said coolant medium is water.

* * * * *